(No Model.)

T. BRUGER.
ELECTRIC MEASURING APPARATUS.

No. 511,503. Patented Dec. 26, 1893.

WITNESSES:
Charles Schroeder
Adolph Scherer

INVENTOR
T. Bruger
BY Guipel & Raegener
ATTORNEYS.

United States Patent Office.

THEODOR BRUGER, OF BOCKENHEIM, NEAR FRANKFORT-ON-THE-MAIN, GERMANY, ASSIGNOR TO HARTMANN & BRAUN, OF SAME PLACE.

ELECTRIC MEASURING APPARATUS.

SPECIFICATION forming part of Letters Patent No. 511,503, dated December 26, 1893.

Application filed August 19, 1893. Serial No. 483,501. (No model.) Patented in Germany September 12, 1885, No. 36,554, and June 21, 1887, No. 39,869.

*To all whom it may concern:*

Be it known that I, THEODOR BRUGER, a subject of the Emperor of Germany, resident at Bockenheim, near Frankfort-on-the-Main, Germany, (assignor to the firm of HARTMANN & BRAUN, of Bockenheim, Germany,) have invented certain new and useful Improvements in Electric Measuring Apparatus, (for which I have obtained Letters Patent in Germany, dated September 12, 1885, and numbered 36,554, and an additional patent thereto, dated June 21, 1887, and numbered 39,869,) of which the following is a specification.

This invention relates to an improved electric measuring instrument which can be constructed as an electro-magnetic or as an electro-dynamic apparatus, and which is especially intended to be used in the latter form, as in the same all causes of inaccuracies produced by the inconstancy of the magnets are avoided and which instrument can be used for measuring both continuous and alternating currents. The construction is based on the mutual action of two con-axial solenoids, of which one is stationary and the other movable relatively to the stationary one, in such a manner that a considerable sensitiveness and an accurate scale are obtained.

The invention consists in the combination with a stationary polarized solenoid, of a double solenoid, the succession of the poles of which is positive negative and negative positive, said double solenoid being mounted con-axially to the stationary solenoid and adapted to move over the same.

The invention also consists in the construction and combination of parts and details as will be fully described and set forth hereinafter and finally pointed out in the claims.

Figure 1:
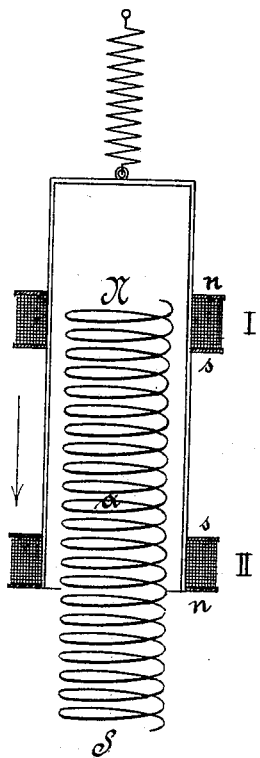
Figure 2:
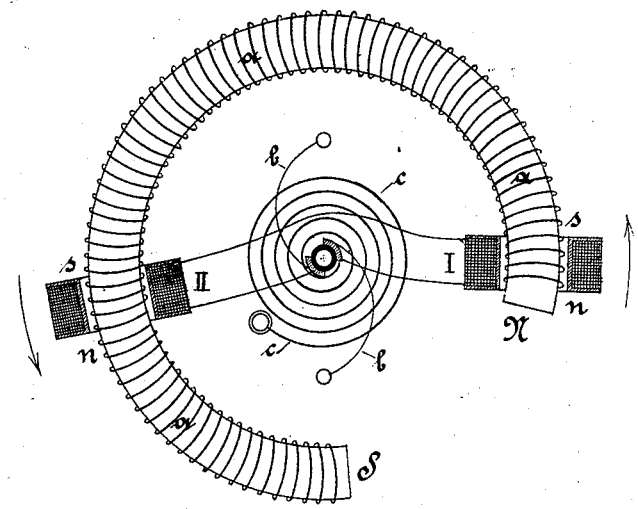
Figure 3:
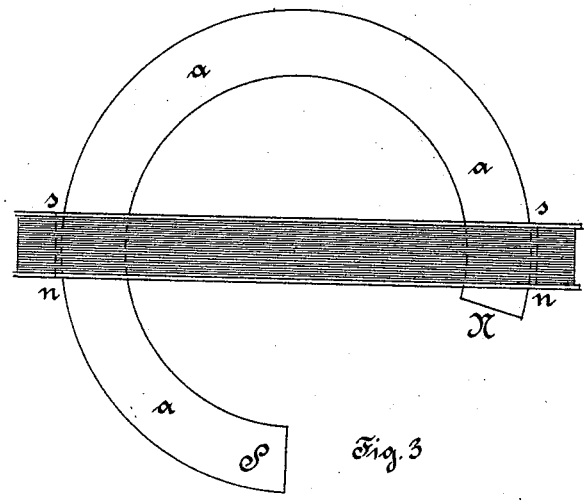

In the accompanying drawings, Figure 1 is a sectional diagram of my improved electric measuring instrument. Fig. 2 is a longitudinal sectional view of the instrument, showing a modified construction, and Fig. 3 is an elevation of the further modified construction.

Similar letters of reference indicate corresponding parts.

In Fig. 1 of the drawings, $a$ represents a stationary polarized solenoid which acts simultaneously on two con-axial short solenoids I and II, that are rigidly connected with each other but have a common movement and which are joined in series or parallel in such a manner that the succession of their poles is positive negative and negative positive, (N S and S N.)

If one of the movable solenoids I or II is moved slightly toward the stationary solenoid in the direction of the arrow, the strength of the current being constant, it will be found that the motive power which is exerted on the solenoid I, decreases rapidly during the movement from the positive end N of the solenoid $a$ to the center of the same. If therefore, the solenoid I is under the influence of a variable current and the opposite solenoid II under the influence of a spring or of gravity, a scale is obtained with sub-divisions which decrease in size. If on the contrary the solenoid II alone is moved on the solenoid $a$ from the center of the latter toward the negative end S and is subjected to the same influences as the solenoid I, a scale is obtained the divisions of which are very small at the beginning of the movement and increase rapidly when the solenoid II approaches the negative pole S. Hence it follows, that by the simultaneous use of the two solenoids I and II an equalized movement is obtained which produces a much more uniform scale than could be obtained if only one solenoid were used.

By the use of two solenoids which are joined and arranged as shown in Fig. 1, the additional advantage is obtained that in alternating currents the noxious influences, caused by the mutual induction between a fixed coil and a movable solenoid, are to a great degree avoided in consequence of the opposed polarity of the two movable solenoids.

Fig. 2 shows a measuring instrument in which the above described arrangement and connections are utilized. The stationary straight solenoid $a$ of Fig. 1 is here replaced by a circularly curved solenoid, and the two movable solenoids I and II are mounted on an axle which is either mounted on pins or suspended from a cocoon thread. The current is admitted to the movable parts of the instrument through narrow silver bands $b$, while the torsion spring $c$ acts against the turning action of the current. Such measuring instruments can, according to their winding be used for various purposes; and they can especially be used for Watt-meters if the stationary solenoid is provided with a thick wire for the main current and the movable coils are placed in the tension conductor. In this case it is advisable to taper the stationary solenoid toward the ends so as to obtain an almost uniform scale. If the instrument is to be constructed as an electro dynamometer, the movable solenoids, which are to be suitably wired, are connected with the stationary solenoid either parallel or in series, the latter especially in case a volt-meter has to be constructed. In this case the ring can be made cylindrical throughout its greatest extent and need only be tapered off at the end of the negative pole. In some cases the instrument can be simplified still more by using in place of the two solenoids I and II, only one solenoid of such size that the arc-shaped solenoid $a$ can be placed therein, as shown in Fig. 3. As will be readily understood by an examination of the poles, the action of such an arrangement is like that of an instrument constructed as shown in Fig. 2. The arrangement can also be made in such a manner that the double solenoid is stationary and the polarized solenoid movable, and also the polarized solenoid can be arranged outside of the double solenoid. The above described arrangement can also be used for instruments that are not purely electro-dynamic measuring instruments and in this case electric-magnets or permanent magnets are used in place of the single solenoids or the double solenoid. For such purposes these magnets are known to be the equivalents of the solenoids and therefore they are within the scope of the present invention.

Having thus described my invention, I claim as new and desire to secure by Letters Patent—

1. In an electric measuring instrument, the combination with a stationary polarized solenoid, of a double solenoid, the succession of poles of which is positive negative and negative positive, said double solenoid being mounted con-axially with the stationary solenoid and adapted to move over the same, substantially as set forth.

2. In an electric measuring instrument, the combination with a stationary polarized arc-shaped solenoid, of a double solenoid, the succession of poles of which is positive negative and negative positive, said double solenoid being mounted con-axially with the stationary solenoid and adapted to move over the same, substantially as set forth.

3. In an electric measuring instrument, the combination with a stationary polarized solenoid, the succession of poles of which is positive negative and negative positive, said double solenoid being mounted con-axially with the stationary solenoid, means for applying an electric current to the double solenoid, so as to move the same relatively to the stationary solenoid and a counter-acting spring for said double solenoid, substantially as set forth.

In testimony that I claim the foregoing as my invention I have signed my name in presence of two subscribing witnesses.

THEODOR BRUGER.

Witnesses:
J. CARL TOHLE,
JOH. ANTON GÖLZ.